United States Patent
Bajko

(10) Patent No.: US 9,504,026 B2
(45) Date of Patent: Nov. 22, 2016

(54) KEEP ALIVE PERIODICITY DETERMINATION FOR WIFI NETWORKS

(71) Applicant: NOKIA CORPORATION, Espoo (FI)

(72) Inventor: Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 450 days.

(21) Appl. No.: 13/714,366

(22) Filed: Dec. 13, 2012

(65) Prior Publication Data
US 2014/0169338 A1  Jun. 19, 2014

(51) Int. Cl.
H04W 72/04 (2009.01)
H04W 76/04 (2009.01)

(52) U.S. Cl.
CPC ......... H04W 72/042 (2013.01); H04W 76/045 (2013.01)

(58) Field of Classification Search
USPC .................................................. 370/248, 310
See application file for complete search history.

(56) References Cited

U.S. PATENT DOCUMENTS

| | | |
|---|---|---|
| 7,634,558 B1 | 12/2009 | Mangal et al. |
| 7,880,616 B2 | 2/2011 | Kanagala et al. |
| 8,065,419 B2 | 11/2011 | Vimpari et al. |
| 2008/0059582 A1 | 3/2008 | Hartikainen et al. |
| 2008/0181161 A1* | 7/2008 | Gi Kim et al. ............... 370/312 |
| 2011/0286373 A1 | 11/2011 | Herzog |
| 2012/0147800 A1* | 6/2012 | Park et al. .................... 370/311 |
| 2012/0167118 A1 | 6/2012 | Pingili et al. |
| 2012/0185577 A1 | 7/2012 | Giaretta et al. |

FOREIGN PATENT DOCUMENTS

WO   WO-2008029314 A2   3/2008

OTHER PUBLICATIONS

PCT Search Report dated Jan. 10, 2014 for PCT application No. PCT/FI2013/051012.
Chapter 23, TCP Keepalive Timer, http://www.pcvr.nl/tcpip/tcp_keep.htm.
Bing, B. "Emerging Technologies in Wireless LANs: Theory, Design and Deployment". Nov. 5, 2007, Cambridge University Press, New York. pp. 385, 434-435.

* cited by examiner

*Primary Examiner* — Hassan Kizou
*Assistant Examiner* — Ashil Farahmand
(74) *Attorney, Agent, or Firm* — Mintz Levin Cohn Ferris Glovsky and Popeo, P.C.

(57) ABSTRACT

Methods and apparatus, including computer program products, are provided for keep alive messages. In one aspect there is provided a method. The method may include receiving, at a user equipment, an indicator sent by a wireless access point, wherein the indicator represents a time to send at least one keep alive message to enable maintenance of at least one binding in at least one intermediate node; and generating, by the user equipment, the at least one keep alive message. Related apparatus, systems, methods, and articles are also described.

16 Claims, 5 Drawing Sheets

KEEP ALIVE PERIODICITY DETERMINATION FOR WIFI NETWORKS

FIELD

The subject matter disclosed herein relates to wireless communications.

BACKGROUND

When connected to a network, a mobile wireless device (also referred to as a user equipment) may be behind so-called "intermediate nodes," such as firewalls, network address translators, and the like, that can limit the accessibility and visibility of the mobile wireless device. To maintain connectivity, the mobile wireless device may establish a connection to a server and then attempt to maintain the connection by sending keep alive messages to the server. When the mobile wireless device sends keep alive messages to the server on a timely basis, these messages traverse the intermediate node and maintain a binding at the intermediate node to enable the connection to remain open between the mobile wireless device and the server. As such, the mobile wireless device may periodically send keep alive messages to the server to keep current the binding at the intermediate node.

SUMMARY

Methods and apparatus, including computer program products, are provided for keep alive messages in networks, such as WiFi access networks.

In some example embodiments, there is provided a method. The method may include receiving, at a user equipment, an indicator sent by a wireless access point, wherein the indicator represents a time to send at least one keep alive message to enable maintenance of at least one binding in at least one intermediate node; and generating, by the user equipment, the at least one keep alive message.

In some example embodiments, one of more variations may be made as well as described in the detailed description below and/or as described in the following features. The indicator may be received from at least one of a beacon transmitted by a wireless access point or a message sent by the wireless access point. The method may further include sending, based on the received indicator, the at least one keep alive message to maintain the at least one binding in the at least one intermediate node. The binding may maintain at least one of a transmission control protocol connection or a user datagram protocol connection between the user equipment and a device. The method may further include waiting, based on the received indicator and a basic service set maximum idle period parameter, to send the at least one keep alive message, wherein the sending of the at last one keep alive message enables the at least one binding to be maintained at the at least one intermediate node and enables an association between the user equipment and the wireless access point to be maintained at the wireless access point. The wireless access point may include a WiFi wireless access point.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
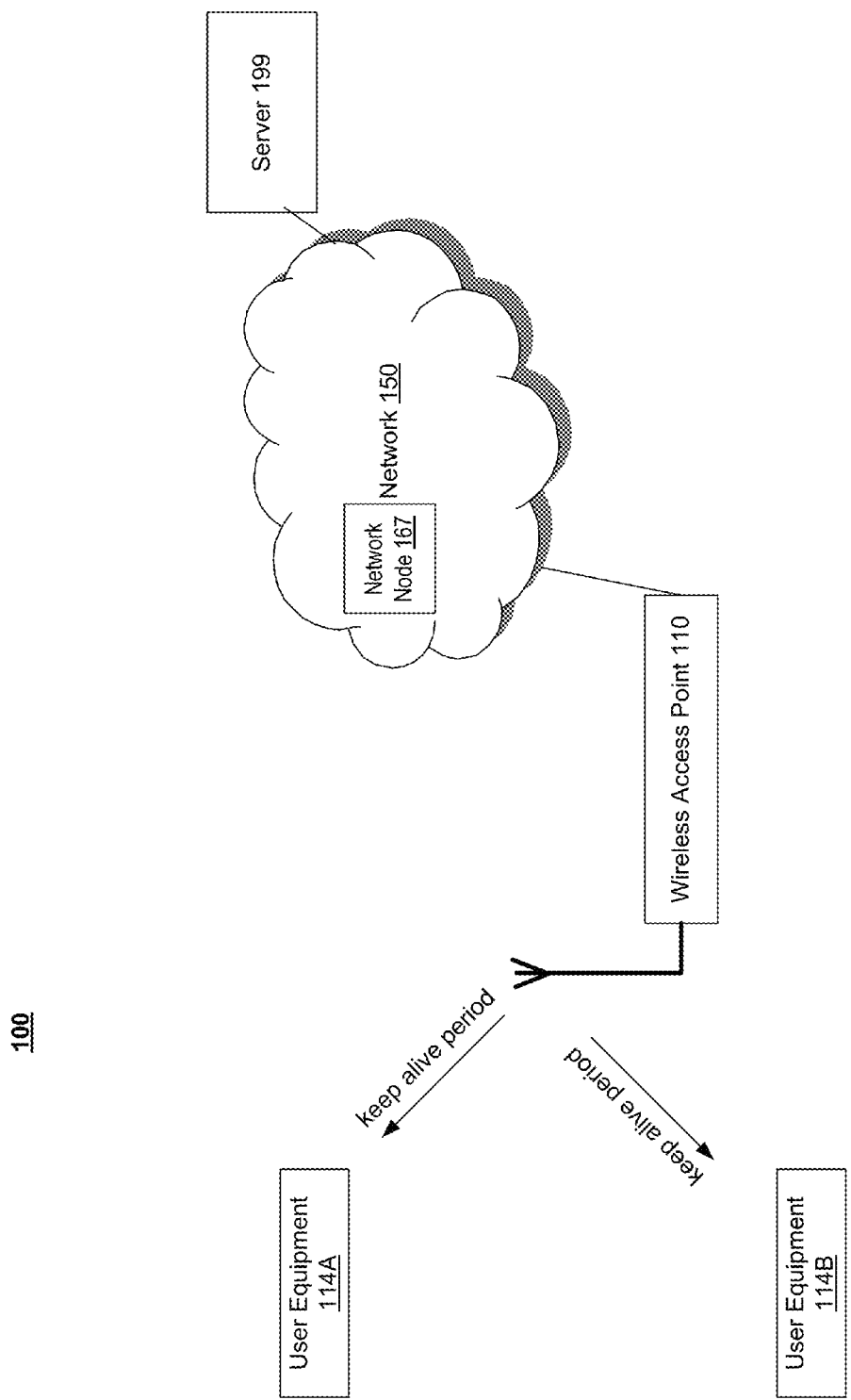
FIG. 1 depicts an example of a system, in accordance with some example embodiments.

Like labels are used to refer to same or similar items in the drawings.

DETAILED DESCRIPTION

In some example embodiments, the subject matter disclosed herein may relate to a wireless access point providing to one or more user equipment a value (also referred to herein as a keep alive period or a time out) representative of a time when a keep alive message should be sent to a destination in order to maintain a binding for a connection through one or more network nodes. In some example embodiments, the wireless access point may determine this keep alive period, which is sent to the user equipment.

In some example embodiments, the wireless access point may provide the keep alive period in a beacon transmitted, or broadcasted, to the one or more user equipment, or the wireless access point may provide the keep alive period in a probe response frame sent to the user equipment. As such, the user equipment may not need, in some example embodiments, to determine the keep alive period.

In some example embodiments, the wireless access point may determine a value for the keep alive period. To determine the keep alive period, the wireless access point may determine the time out at intermediate nodes. For example, the keep alive period may be selected so that keep alive messages, sent in accordance with the keep alive period, prevent a time out at the intermediate nodes (for example, a time out of a connection, such as a TCP and/or UDP connection carried by one or more intermediate nodes). The wireless access point may also periodically monitor (for example, recheck) the time out periods at the intermediate nodes to determine whether any network configuration changes have cause a change to the previously determined keep alive period.

In some example embodiments, the wireless access point may be configured in accordance with at least WiFi (for example, the IEEE 802.11 series of standards including additions and revisions thereto), although other radio access technologies may be implemented as well.

In some example embodiments, the user equipment may be configured to send a tuple, such as a 5-tuple, to a wireless access point configured to use that 5-tuple when sending, on behalf of the user equipment, keep alive messages to a destination device, such as a destination server and the like. Once the wireless access point receives the 5-tuple, the wireless access point may periodically send, based on the 5-tuple, keep alive messages to maintain one or more connections, such as TCP/UDP connections, to the destination device/server. And, these keep alive messages enable the intermediate nodes carrying the connections to not time out the connections (for example, keeping the bindings for the connections current in the intermediate nodes). The 5-tuple may include a source Internet Protocol (IP) of the user equipment, a destination IP address for a destination device (for example, a destination server, another user equipment, and the like), a protocol, a source port number, and a destination port number. The 5-tuple may, as noted, provide sufficient information to allow the wireless access point to send to a destination device keep alive messages on behalf of the user equipment. And, these keep alive messages may, as noted, enable the maintenance of TCP/UDP connection bindings at the intermediate nodes, without the user equipment having to wake up (or become active) and send keep alive messages.

In some example embodiments, the user equipment may receive the keep alive period from the wireless access point. However, the user equipment may adapt when to send the keep alive messages based on the received keep alive period and/or an idle time. The idle time may represent a time during which the wireless access point will disassociate with the user equipment if the user equipment has not sent any data, messages, and/or frames to the wireless access point. An example of the idle time is the basic service set (BSS) maximum idle period described in the IEEE 802.11 series of standards. To illustrate, the user equipment may receive the keep alive period from the wireless access point and determine whether the keep alive period is longer, shorter, or the same as the idle time. If the keep alive period is shorter than the idle time, the user equipment may send a keep alive message in accordance with the keep alive time period value. In this example, the keep alive message performs a dual function of maintaining the TCP/UDP bindings at intermediate nodes and maintaining the association between the user equipment and the wireless access point. If the keep alive period is longer than the idle time, the user equipment may instead send a keep alive message in accordance with the idle time, so the keep alive message also serves the dual function. And, if the keep alive period is about the same as the idle time, the user equipment may send a keep alive message in accordance with the idle time and/or keep alive period, so again the keep alive message serves the dual function.

Before providing additional examples, the following provides an example of a system framework in which some of the example embodiments described herein may be implemented.

FIG. 1 depicts a system 100 according to some example embodiments. System 100 may include one or more user equipment, such as user equipment 114A-B, and one or more access points, such as wireless access point 110. In some example embodiments, wireless access point 110 may be implemented in accordance with WiFi, such as one or more of the IEEE 802.11 standards as well as any subsequent revisions and additions to those standards, although wireless access point 110 may also be configured in accordance with other radio access technologies and/or standards as well. However, the subject matter disclosed herein is not limited to any specific standard or technology.

The wireless access point 110 may include one or more links to network 150. Network 150 may comprise one or more of the following: a public land mobile network, the Internet, backhaul links, wired links, and any other form of communications. Moreover, the network 150 may include at least one intermediate network node 167, such as a network address translator, a firewall, and the like. As noted, these intermediate network nodes may require a keep alive message in order to keep a binding for a TCP and/or UDP connection between the user equipment and a server. If the binding expires, the intermediate node may drop the connection, and, as a consequence, the user equipment will no longer be reachable by the server 199.

In some example embodiments, user equipment 114A-B may be implemented as a mobile device and/or a stationary device. The user equipment 114A-B are often referred to as, for example, mobile stations, mobile units, subscriber stations, wireless terminals, tablets, smart phones, devices, or the like. In some example embodiments, the user equipment may include one or more processors, one or more computer-readable storage medium (for example, memory, storage, and the like), one or more radio access components (for example, a modem, a transceiver, and the like), and/or a user interface.

In some example embodiments, the user equipment 114A-B may be implemented as multi-mode user devices configured to operate using a plurality of radio access technologies, although a single-mode device may be used as well. For example, the user equipment may be configured to operate using a plurality of radio access technologies including one or more of the following: wireless local area network (WLAN) technology, such as 802.11 WiFi and the like, Long Term Evolution (LTE), Bluetooth, Bluetooth low energy (BT-LE), near field communications (NFC), and any other radio access technologies. Moreover, the user equipment may be configured to establish connections, such as TCP and/or UDP connections, to destination devices, such as server 199, other user equipment, and the like.

Although FIG. 1 depicts two user equipment 114A-B, a single wireless access point 110, a network 150, and a single server 199, other quantities and configurations of these elements may be implemented as well.

Figure 2:
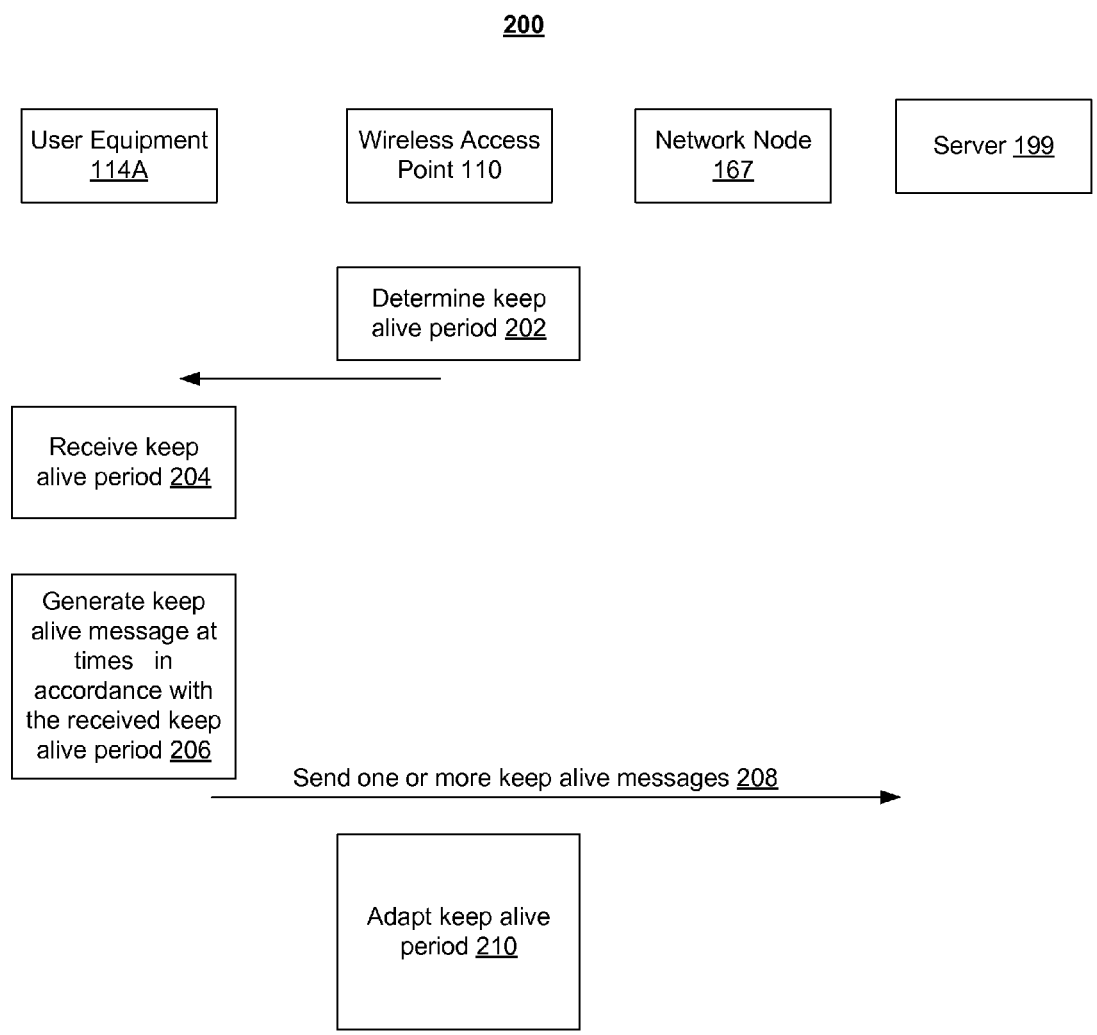
FIG. 2 depicts an example of a process for an access point to determine and send a keep alive period to a user equipment, in accordance with some example embodiments.

FIG. 2 depicts an example process 200 for providing keep alive periods to user equipment, in accordance with some example embodiments. The description of process 200 also refers to FIG. 1.

At 202, the wireless access point may, in some example embodiments, determine a keep alive period. For example, the wireless access point 110 may determine the keep alive time period by accessing a predetermined keep alive period and/or determining a time for the keep alive period (for example, by accessing, monitoring, and/or checking one or more intermediate nodes to determine a time out period associated with those intermediate nodes).

At 204, the user equipment may, in some example embodiments, receive an indicator representative of the keep alive period. For example, the indicator may directly include the keep alive period or include a value which can be mapped to the keep alive period. In some example embodiments, the wireless access point 110 may broadcast the keep alive period in a beacon, which is received by one or more user equipment 114A-B and the like within the coverage area of wireless access point 110. In some example embodiments, the user equipment 114A may receive the keep alive period in a message, such as a probe response frame. For example, user equipment 114A may send a message, such as a request for a time out, a keep alive period, and any other message, to wireless access point 110. In response, user equipment 114A may receive another message including the keep alive period sent by the wireless access point 110. The keep alive period may represent an interval at which the keep alive message(s) should be sent by the user equipment, or any other value representative of how long the user equipment 114A may wait before sending a keep alive message.

At 206-208, the user equipment may generate and send one or more keep alive messages at one or more times that are in accordance with the keep alive period received at 204. For example, user equipment 114A may send keep alive message to server 199 via network node 167 at times based on the keep alive period. The keep alive message may be destined to a device, such as server 199 and may keep a connection binding at network node 167 current, allowing thus a TCP and/or UDP connection to be maintained from user equipment 114A to server 199 via network node 167. Without keep alive messages, network node 167 may delete the binding, so that packets sent from the server 199 to the user equipment 114A may not traverse the network node 167 and reach the user equipment. To illustrate with a numerical example, if the keep alive period is 30 seconds, then the user equipment 114A may send a first generated keep alive message at about 30 seconds, a second generated keep alive message at about 30 seconds after the first message, and so forth to maintain a TCP and/or UDP connection binding at network node 167. The keep alive messages may also serve the dual function noted above.

At 210, the wireless access point may adapt the keep alive time period. For example, the wireless access point 110 may periodically re-determine the time out values at intermediate nodes to be able to detect any network configuration changes that result in a different keep alive period. For example, if a network change causes a time out value at an intermediate firewall to decrease, the keep alive period may be decreased as well and subsequent keep alive messages may be sent in accordance with the revised keep alive period.

Figure 3:
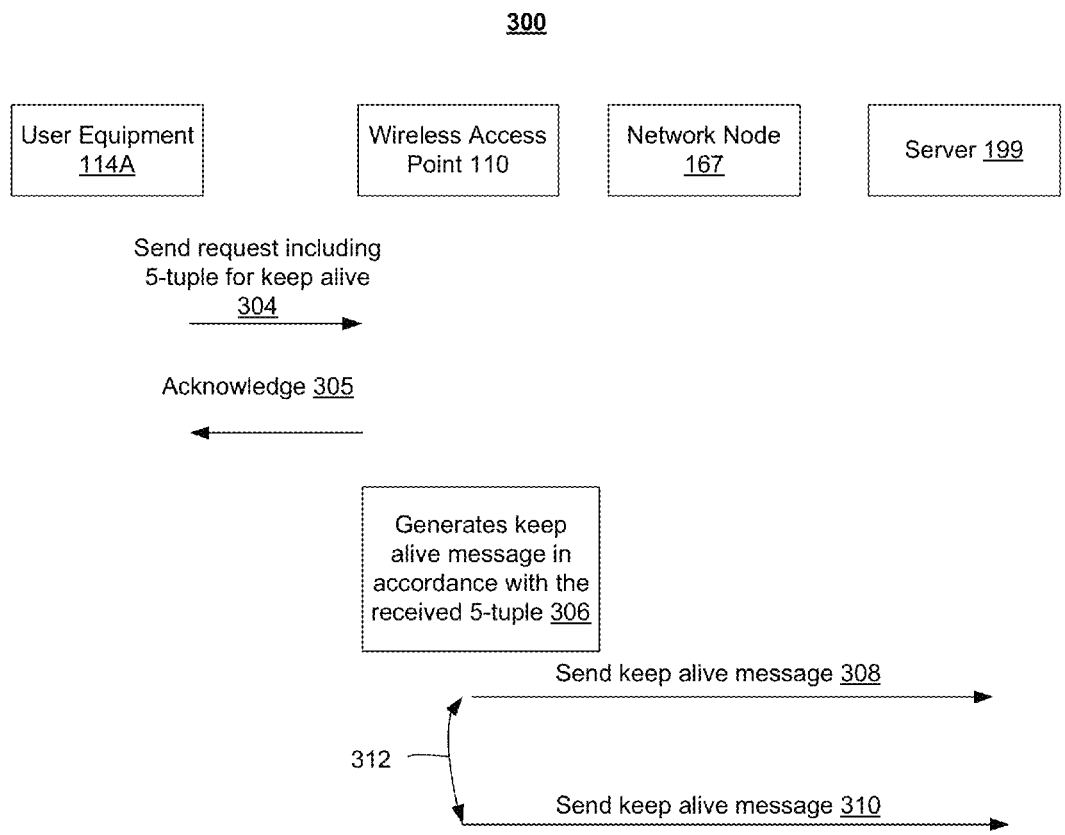
FIG. 3 depicts an example of a process for sending a tuple to an access point to enable the access point to send keep alive messages on behalf of the user equipment, in accordance with some example embodiments.

FIG. 3 depicts an example process 300 during which a user equipment sends a 5-tuple, including a source IP address, destination IP address, source port, destination port, and protocol, to a wireless access point, enabling thus the wireless access point to periodically send keep alive messages on behalf of the user equipment, in accordance with some example embodiments. The description of process 300 also refers to FIG. 1.

At 304, the user equipment may, in some example embodiments, send a 5-tuple to the wireless access point. For example, user equipment 114A may send an association request message including the 5-tuple to wireless access point 110, although other types of WiFi frames may be used as well to carry the 5-tuple information element. The 5-tuple includes information enabling the wireless access point 110 to send keep alive messages on behalf of the user equipment to a destination device, such as destination server 199. For example, the 5-tuple may include one or more of the following: a source Internet Protocol (IP) address of the user equipment, a destination IP address (for example, a destination server, device, another user equipment, and the like), a protocol, a source port number, and a destination port number. As such, a keep alive message may be formed based on one or more aspects of the 5-tuple.

At 305, the wireless access point may, in some example embodiments, send an acknowledgement message to indicate that the message sent at 304 was received by the wireless access point and that the wireless access point is configured to send keep alive messages on behalf of the user equipment At 306, the wireless access point may, in some example embodiments, generate keep alive messages based on the received 5-tuple. For example, wireless access point 110 may generate a keep alive message to send to server 199 via network node 167, and the keep alive message may include a source Internet Protocol (IP) address at user equipment 114A, a destination address at server 199, a source port number at user equipment 114A, and a destination port number at server 199 for a TCP and/or UDP message.

At 308 and 310, the wireless access point 110 may send generated keep alive messages to server 199 via network node 167, in accordance with some example embodiments. The keep alive messages may be sent in accordance with the keep alive period, which in the example of FIG. 3 is represented as an interval 312 about equal to the keep alive period.

Figure 4:
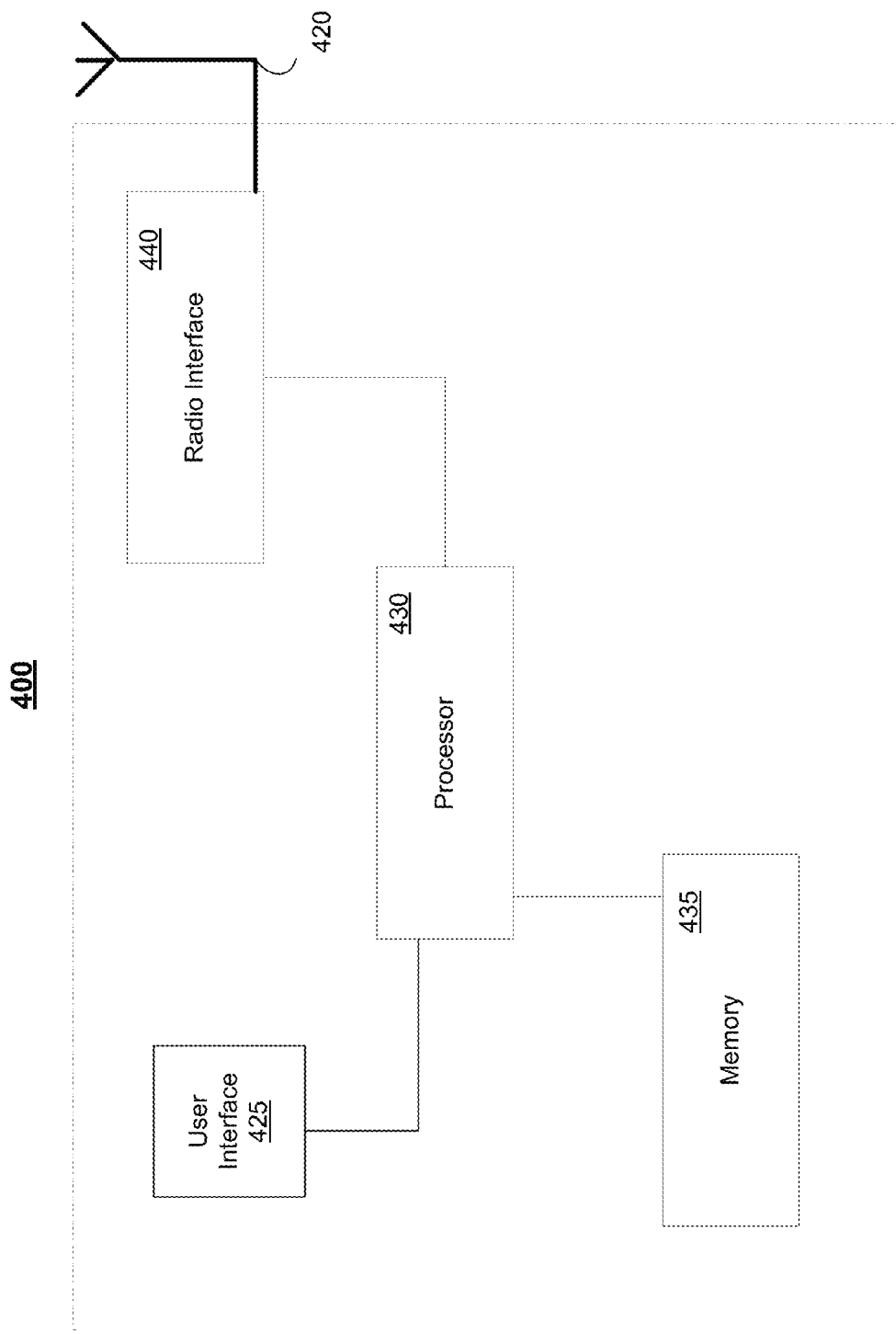
FIG. 4 depicts an example of a radio, in accordance with some example embodiments.

FIG. 4 depicts a block diagram of a radio 400 that may be used at user equipment 114A-B, in accordance with some example embodiments. The user equipment may include one or more antennas 420 for receiving a downlink and transmitting via an uplink. The user equipment 400 may also include a radio interface 440 (also referred to as a modem) coupled to the antenna 420. The radio interface 440 may correspond to a plurality of radio access technologies including one or more of LTE, WLAN, Bluetooth, BT-LE, NFC, RFID, UWB, ZigBee, and the like. The radio interface 440 may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. The user equipment 400 may further include a user interface 425, at least one processor, such as processor 430, for controlling user equipment 400 and for accessing and executing program code stored in memory 435.

In some example embodiments, the memory 435 includes code, which when executed by at least one processor causes one or more of the operations described herein with respect to user equipment, such as process 200, 300, and the like. For example, the user equipment may generate and/or send keep alive messages based on a keep alive period received from a wireless access point, send a 5-tuple to a wireless access point to enable the wireless access point to send keep alive messages on behalf of the user equipment, send keep alive messages based on a max idle time for a wireless access point, and/or perform any other operations associated with the user equipment disclosed herein.

Figure 5:
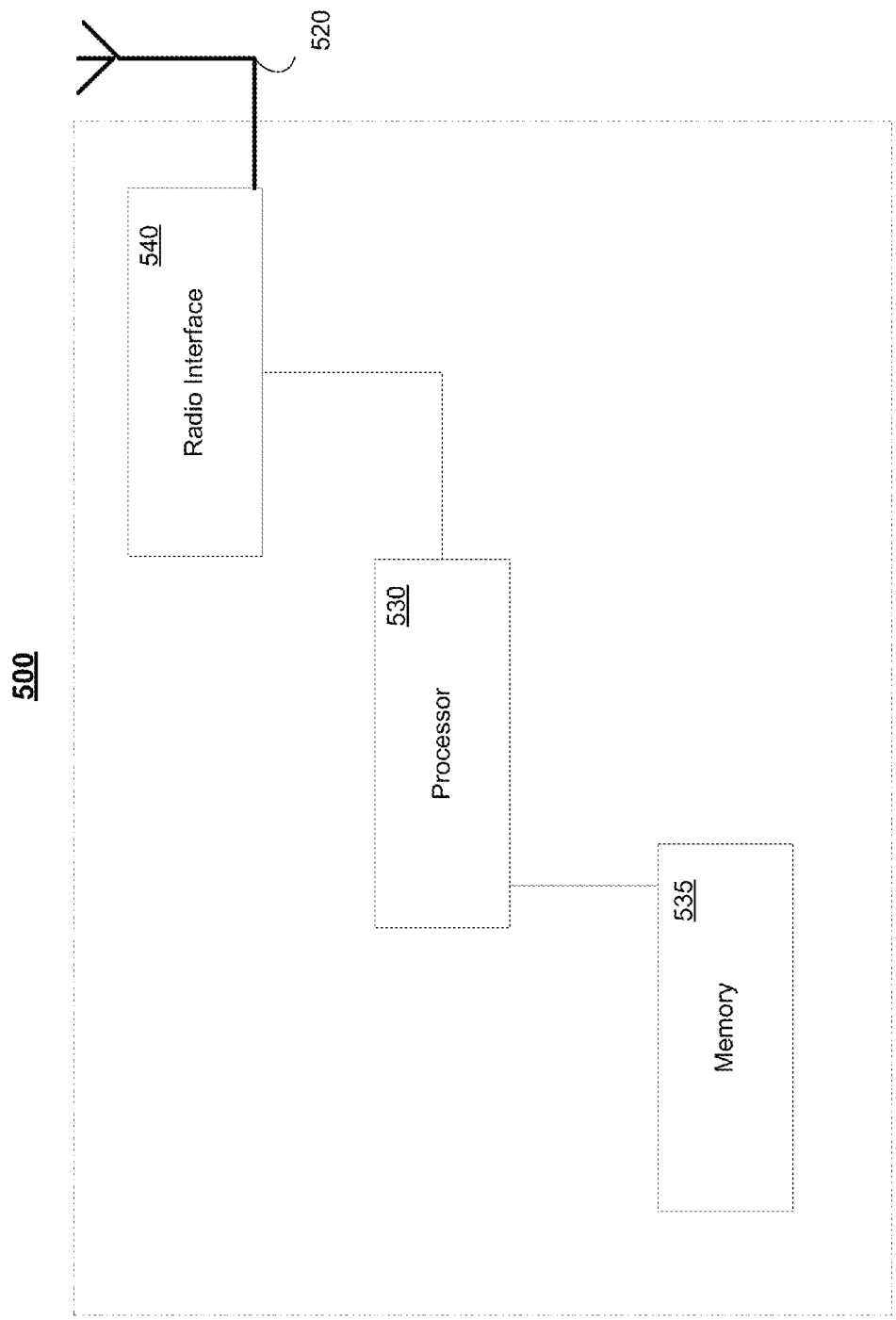
FIG. 5 depicts an example of a wireless access point, in accordance with some example embodiments.

FIG. 5 depicts an example implementation of a wireless access point 500, which may be implemented at wireless access point 110, in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, BT-LE, NFC, radio frequency identifier (RFID), ultrawideband (UWB), ZigBee, and the like. The radio interface 540 may include components, such as filters, converters (for example, digital-to-analog converters and the like), mappers, a Fast Fourier Transform (FFT) module, and the like, to generate a beacon The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to the base stations/wireless access points. For example, the wireless access point 500 may be configured determine a keep alive period, send keep alive periods to the user equipment, send keep alive messages on behalf of the user equipment, and/or perform any other operations associated with the wireless access point disclosed herein. Moreover, the wireless access point may be configured to send one or more of these features disclosed herein with respect to keep alive messages in a capabilities message sent to the user equipment.

Without in any way limiting the scope, interpretation, or application of the claims appearing herein, a technical effect of one or more of the example embodiments disclosed herein may, in some example implementations, comprise a more stable keep alive value. Specifically, because the wireless access point is in more of a static network configuration when compared to a mobile user equipment, the determination of the keep alive period by the wireless access point is more likely to remain stable, when compared to a value determined by a mobile user equipment. Without in any way limiting the scope, interpretation, or application of the claims appearing herein, a technical effect of one or more of the example embodiments disclosed herein may, in some example implementations, comprise reducing battery consumption and/or conserving processing resources/time. Specifically, using the wireless access point to determine the keep alive period may, in some example implementations, reduce battery consumption at the user equipment. Furthermore, in the case of a roaming user equipment, processing resources and time may be saved as the more static wireless access point can provide the keep alive period to the user equipment, rather than requiring the user equipment to repeatedly determine an appropriate keep alive period as it roams among access points and/or networks.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A method, comprising:
   receiving, at a user equipment, an indicator determined by a wireless access point, wherein the indicator represents a keep alive period to send at least one keep alive message to enable maintenance of at least one binding in at least one intermediate node;
   determining, by the user equipment and based on the received indication and an idle time, a timing for sending the at least one keep alive message, wherein the idle time represents a predetermined time during which the wireless access point will disassociate with the user equipment if the user equipment has not sent a transmission to the access point; and
   transmitting, by the user equipment and according to the determined timing, the at least one keep alive message to the wireless access point.

2. The method of claim 1, wherein the receiving further comprises: receiving the indicator from a beacon transmitted by a wireless access point.

3. The method of claim 1, wherein transmitting the at least one keep alive message maintains the at least one binding in the at least one intermediate node.

4. The method of claim 1, wherein the binding maintains at least one of a transmission control protocol connection or a user datagram protocol connection between the user equipment and a device.

5. The method of claim 1 further comprising:
   waiting, by the user equipment and based on the received indicator and the idle time, to transmit the at least one keep alive message, wherein transmitting the at last one keep alive message enables an association between the user equipment and the wireless access point to be maintained at the wireless access point.

6. The method of claim 1, wherein the wireless access point comprises a WiFi wireless access point.

7. The method of claim 1, wherein the indicator is received as a message from the wireless access point.

8. An apparatus comprising:
at least one processor; and
at least one memory including computer program code for one or more programs, the at least one processor, the at least one memory, and the computer program code configured to cause the apparatus to at least:
receive an indicator determined by a wireless access point, wherein the indicator represents a keep alive period to send at least one keep alive message to enable maintenance of at least one binding in at least one intermediate node;
determine, based on the received indication and an idle time, a timing for sending the at least one keep alive message, wherein the idle time represents a predetermined time during which the wireless access point will disassociate with the apparatus if the apparatus has not sent a transmission to the access point; and
transmit, according to the determined timing, the at least one keep alive message to the wireless access point.

9. The apparatus of claim 8 further configured to at least receive the indicator from a beacon transmitted by a wireless access point.

10. The apparatus of claim 8, wherein transmitting the the at least one keep alive message maintains the at least one binding in the at least one intermediate node.

11. The apparatus of claim 8, wherein the binding maintains at least one of a transmission control protocol connection or a user datagram protocol connection between the apparatus and a device.

12. The apparatus of claim 8 further configured to at least wait, based on the received indicator and the idle time, to transmit the at least one keep alive message, wherein the transmitting the at least one keep alive message enables an association between the apparatus and the wireless access point to be maintained at the wireless access point.

13. The apparatus of claim 8, wherein the wireless access point comprises a WiFi wireless access point, and wherein the apparatus comprises a user equipment.

14. A non-transitory computer-readable medium encoded with instructions that, when executed by a processor, perform at least the following:
receiving, at a user equipment, an indicator determined by a wireless access point, wherein the indicator represents a keep alive period to send at least one keep alive message to enable maintenance of at least one binding in at least one intermediate node;
determining, by the user equipment and based on the received indication and an idle time, a timing for sending the at least one keep alive message, wherein the idle time represents a predetermined time during which the wireless access point will disassociate with the user equipment if the user equipment has not sent a transmission to the access point; and
transmitting, by the user equipment and according to the determined timing, the at least one keep alive message to the wireless access point.

15. The non-transitory computer-readable medium of claim 14, wherein transmitting the at least one keep alive message maintains the at least one binding in the at least one intermediate node.

16. The non-transitory computer-readable medium of claim 14, wherein the receiving further comprises: receiving the indicator from a beacon transmitted by a wireless access point.

* * * * *